United States Patent
Fernando et al.

(10) Patent No.: US 9,775,380 B2
(45) Date of Patent: Oct. 3, 2017

(54) ELECTRICALLY HEATED SMOKING SYSTEM

(75) Inventors: Felix Fernando, Wokingham (GB); Marc Robert Chemla, Aubonne (CH); Fredrik Stahle, Vevey (CH)

(73) Assignee: Philip Morris USA Inc., Richmond, VA (US)

( * ) Notice: Subject to any disclaimer, the term of this patent is extended or adjusted under 35 U.S.C. 154(b) by 402 days.

(21) Appl. No.: 12/785,074

(22) Filed: May 21, 2010

(65) Prior Publication Data

US 2010/0313901 A1    Dec. 16, 2010

(30) Foreign Application Priority Data

May 21, 2009  (EP) ..................... 09251364

(51) Int. Cl.
*A24F 47/00* (2006.01)
*B65D 43/16* (2006.01)
*B65D 85/10* (2006.01)
*H02J 7/00* (2006.01)

(52) U.S. Cl.
CPC ............ *A24F 47/008* (2013.01); *B65D 43/16* (2013.01); *B65D 85/1081* (2013.01); *H02J 7/007* (2013.01); *H02J 7/0042* (2013.01)

(58) Field of Classification Search
CPC ...... A24F 47/002; A24F 47/008; A61M 15/06
USPC ................... 131/270, 271, 273, 299
See application file for complete search history.

(56) References Cited

U.S. PATENT DOCUMENTS

| | | |
|---|---|---|
| 1,771,366 A | 7/1930 | Wyss et al. |
| 1,968,509 A | 7/1934 | Tiffany |
| 2,057,353 A | 10/1936 | Whittemore, Jr. |
| 2,104,266 A | 1/1938 | McCormick |
| 2,406,275 A | 8/1946 | Wejnarth |

(Continued)

FOREIGN PATENT DOCUMENTS

| | | |
|---|---|---|
| CA | 1 202 378 | 3/1986 |
| CN | 87/104459 A | 2/1988 |

(Continued)

OTHER PUBLICATIONS

European Search Report dated Dec. 12, 2009 for European Patent Application No. 09251364.7-2313.

(Continued)

*Primary Examiner* — Jodi C Franklin

(74) *Attorney, Agent, or Firm* — Buchanan Ingersoll & Rooney PC

(57) ABSTRACT

An electrically heated smoking system includes a secondary unit capable of receiving a smoking article having an aerosol-forming substrate. The secondary unit includes at least one heating element and an interface for connection to a primary power supply for supplying electrical power to the at least one heating element during a pre-heating mode, to increase the temperature of the aerosol-forming substrate to an operating temperature. The secondary unit further includes a secondary power supply arranged to supply electrical power to the at least one heating element during a smoking mode, to maintain the temperature of the aerosol-forming substrate at substantially the operating temperature. The secondary unit also includes secondary circuitry. The electrically heated smoking system optionally includes a primary unit.

1 Claim, 7 Drawing Sheets

(56) References Cited

U.S. PATENT DOCUMENTS

| | | | |
|---|---|---|---|
| 2,442,004 A | 5/1948 | Hayward-Butt |
| 2,971,039 A | 2/1961 | Western |
| 2,974,669 A | 3/1961 | Ellis |
| 3,200,819 A | 8/1965 | Gilbert |
| 3,255,760 A | 6/1966 | Selker |
| 3,258,015 A | 6/1966 | Ellis et al. |
| 3,363,633 A | 1/1968 | Weber |
| 3,402,723 A | 9/1968 | Hu |
| 3,443,049 A | 5/1969 | Hoagland |
| 3,482,580 A | 12/1969 | Hollabaugh |
| 3,608,560 A | 9/1971 | Briskin et al. |
| 3,738,374 A | 6/1973 | Bennett |
| 3,744,496 A | 7/1973 | McCarty et al. |
| 3,804,100 A | 4/1974 | Fariello |
| 3,875,476 A | 4/1975 | Crandall et al. |
| 3,889,690 A | 6/1975 | Guarnieri |
| 3,895,219 A | 7/1975 | Richerson et al. |
| 3,976,529 A | 8/1976 | Weicjselbaum |
| 4,016,061 A | 4/1977 | Wasa et al. |
| 4,068,672 A | 1/1978 | Guerra |
| 4,077,784 A | 3/1978 | Vayrynen |
| 4,098,725 A | 7/1978 | Yamamoto et al. |
| 4,103,144 A | 7/1978 | Pizzarello |
| 4,110,260 A | 8/1978 | Yamamoto et al. |
| 4,131,119 A | 12/1978 | Blasutti |
| 4,141,369 A | 2/1979 | Burruss |
| 4,164,230 A | 8/1979 | Pearlman |
| 4,193,411 A | 3/1980 | Faris et al. |
| 4,215,708 A | 8/1980 | Bron |
| 4,219,032 A | 8/1980 | Tabatznik et al. |
| 4,246,913 A | 1/1981 | Ogden et al. |
| 4,256,945 A | 3/1981 | Carter et al. |
| 4,259,970 A | 4/1981 | Green, Jr. |
| 4,303,083 A | 12/1981 | Burruss, Jr. |
| 4,319,591 A | 3/1982 | Keith et al. |
| 4,327,186 A | 4/1982 | Murata et al. |
| 4,355,222 A | 10/1982 | Geithman et al. |
| 4,393,884 A | 7/1983 | Jacobs |
| 4,407,971 A | 10/1983 | Komatsu et al. |
| 4,416,840 A | 11/1983 | Lee et al. |
| 4,431,903 A | 2/1984 | Riccio |
| 4,436,100 A | 3/1984 | Green, Jr. |
| 4,449,039 A | 5/1984 | Fukazawa et al. |
| 4,463,247 A | 7/1984 | Lawrence et al. |
| 4,467,165 A | 8/1984 | Kiuchi |
| 4,475,029 A | 10/1984 | Yoshida et al. |
| 4,488,335 A | 12/1984 | Fox |
| 4,503,319 A | 3/1985 | Moritoki et al. |
| 4,505,282 A | 3/1985 | Cogbill et al. |
| 4,521,659 A | 6/1985 | Buckley |
| 4,528,121 A | 7/1985 | Matsushita et al. |
| 4,549,905 A | 10/1985 | Yamaguchi et al. |
| 4,555,358 A | 11/1985 | Matsushita et al. |
| 4,562,337 A | 12/1985 | Lawrence |
| 4,570,646 A | 2/1986 | Herron |
| 4,572,216 A | 2/1986 | Josuttis et al. |
| 4,580,583 A | 4/1986 | Greent, Jr. |
| 4,621,649 A | 11/1986 | Osterrath |
| 4,623,401 A | 11/1986 | Derbyshire et al. |
| 4,634,837 A | 1/1987 | Ito et al. |
| 4,637,407 A | 1/1987 | Bonanno et al. |
| 4,659,912 A | 4/1987 | Derbyshire |
| 4,714,082 A | 12/1987 | Banerjee et al. |
| 4,735,217 A | 4/1988 | Gerth et al. |
| 4,765,859 A | 8/1988 | Health et al. |
| 4,771,796 A | 9/1988 | Myer |
| 4,776,353 A | 10/1988 | Lilja et al. |
| 4,789,767 A | 12/1988 | Doljack |
| 4,837,421 A | 6/1989 | Luthy |
| 4,846,199 A | 7/1989 | Rose |
| 4,848,376 A | 7/1989 | Lilja et al. |
| 4,874,924 A | 10/1989 | Yamamoto et al. |
| 4,877,989 A | 10/1989 | Drews et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,966,171 A | 10/1990 | Serrano et al. |
| 4,981,522 A | 1/1991 | Nichols et al. |
| 4,991,606 A | 2/1991 | Serrano et al. |
| 5,016,656 A | 5/1991 | McMurtrie |
| 5,040,551 A | 8/1991 | Schlatter et al. |
| 5,040,552 A | 8/1991 | Schleich et al. |
| 5,042,510 A | 8/1991 | Curtiss et al. |
| 5,045,237 A | 9/1991 | Washburn |
| 5,060,671 A | 10/1991 | Counts et al. |
| 5,075,529 A | 12/1991 | Kudo |
| 5,076,296 A | 12/1991 | Nystrom et al. |
| 5,080,115 A | 1/1992 | Templeton |
| 5,085,804 A | 2/1992 | Washburn |
| 5,093,894 A | 3/1992 | Deevi et al. |
| 5,095,921 A | 3/1992 | Losee et al. |
| 5,101,086 A | 3/1992 | Dion et al. |
| 5,139,594 A | 8/1992 | Rabin |
| 5,144,962 A * | 9/1992 | Counts et al. ............. 131/194 |
| 5,157,242 A | 10/1992 | Hetherington et al. |
| 5,159,940 A | 11/1992 | Hayward et al. |
| 5,179,966 A | 1/1993 | Losee et al. |
| 5,188,130 A | 2/1993 | Hajaligol |
| 5,224,498 A | 7/1993 | Deevi et al. |
| 5,228,460 A | 7/1993 | Sprinkel et al. |
| 5,235,157 A | 8/1993 | Blackburn |
| 5,236,108 A | 8/1993 | House |
| 5,249,586 A | 10/1993 | Morgan et al. |
| 5,261,424 A | 11/1993 | Sprinkel, Jr. |
| 5,268,553 A | 12/1993 | Shimoji |
| 5,269,327 A | 12/1993 | Counts et al. |
| 5,274,214 A | 12/1993 | Blackburn |
| 5,285,050 A | 2/1994 | Blackburn |
| 5,322,075 A | 6/1994 | Deevi et al. |
| 5,353,813 A | 10/1994 | Deevi et al. |
| 5,369,723 A | 11/1994 | Counts et al. |
| 5,372,148 A * | 12/1994 | McCafferty et al. ......... 131/194 |
| 5,388,574 A | 2/1995 | Ingebrethsen |
| 5,388,594 A | 2/1995 | Counts et al. |
| 5,396,911 A | 3/1995 | Casey, III et al. |
| 5,408,574 A | 4/1995 | Deevi et al. |
| 5,469,871 A | 11/1995 | Barnes et al. |
| 5,479,948 A | 1/1996 | Counts et al. |
| 5,498,855 A | 3/1996 | Deevi et al. |
| 5,499,636 A * | 3/1996 | Baggett et al. ............. 131/374 |
| 5,505,214 A | 4/1996 | Collins et al. |
| 5,514,630 A | 5/1996 | Willkens et al. |
| 5,530,225 A | 6/1996 | Hajaligol |
| 5,591,368 A * | 1/1997 | Fleischhauer et al. ....... 219/535 |
| 5,613,504 A | 3/1997 | Collins et al. |
| 5,613,505 A | 3/1997 | Campbell et al. |
| 5,649,554 A * | 7/1997 | Sprinkel et al. ............. 131/329 |
| 5,665,262 A | 9/1997 | Hajaligol |
| 5,666,977 A | 9/1997 | Higgins et al. |
| 5,666,978 A | 9/1997 | Counts et al. |
| 5,708,258 A | 1/1998 | Counts et al. |
| 5,726,421 A * | 3/1998 | Fleischhauer et al. ....... 219/260 |
| 5,730,158 A * | 3/1998 | Collins et al. ............... 131/194 |
| 5,750,964 A | 5/1998 | Counts et al. |
| 5,819,751 A | 10/1998 | Barnes et al. |
| 5,819,756 A | 10/1998 | Mielordt |
| 5,878,752 A * | 3/1999 | Adams et al. ............... 131/329 |
| 5,915,387 A | 6/1999 | Baggett, Jr. et al. |
| 5,934,289 A | 8/1999 | Watkins et al. |
| 5,954,979 A * | 9/1999 | Counts et al. ............... 219/260 |
| 6,040,560 A | 3/2000 | Fleischhauer et al. |
| 6,125,853 A | 10/2000 | Susa et al. |
| 6,155,268 A | 12/2000 | Takeuchi |
| 6,196,218 B1 | 3/2001 | Voges |
| 6,446,426 B1 | 9/2002 | Sweeney et al. |
| 6,598,607 B2 | 7/2003 | Adiga et al. |
| 6,615,840 B1 | 9/2003 | Fournier et al. |
| 6,688,313 B2 | 2/2004 | Wrenn et al. |
| 6,772,756 B2 * | 8/2004 | Shayan ................ 128/203.26 |
| 6,803,545 B2 | 10/2004 | Blake et al. |
| 6,810,883 B2 | 11/2004 | Felter et al. |
| 6,854,470 B1 | 2/2005 | Pu |
| 7,131,599 B2 | 11/2006 | Katase |

(56) References Cited

U.S. PATENT DOCUMENTS

| | | | |
|---|---|---|---|
| 7,185,659 B2* | 3/2007 | Sharpe | 131/243 |
| 7,293,565 B2 | 11/2007 | Griffin et al. | |
| 7,458,374 B2 | 12/2008 | Hale et al. | |
| 7,690,385 B2 | 4/2010 | Moffitt | |
| 7,726,320 B2 | 6/2010 | Robinson et al. | |
| 7,832,410 B2 | 11/2010 | Hon | |
| 7,845,359 B2 | 12/2010 | Montaser | |
| 7,997,280 B2 | 8/2011 | Rosenthal | |
| 8,079,371 B2 | 12/2011 | Robinson et al. | |
| 8,205,622 B2 | 6/2012 | Pan | |
| 2002/0119873 A1 | 8/2002 | Heitmann | |
| 2004/0200488 A1 | 10/2004 | Felter et al. | |
| 2005/0016550 A1 | 1/2005 | Katase | |
| 2006/0112963 A1 | 6/2006 | Scott et al. | |
| 2006/0118128 A1* | 6/2006 | Hoffmann | A24F 47/004 131/271 |
| 2006/0196518 A1 | 9/2006 | Hon | |
| 2007/0046254 A1* | 3/2007 | Chen | H02J 7/0068 320/107 |
| 2007/0074734 A1* | 4/2007 | Braunshteyn et al. | 131/328 |
| 2007/0102013 A1 | 5/2007 | Adams et al. | |
| 2008/0230052 A1 | 9/2008 | Montaser | |
| 2008/0276947 A1 | 11/2008 | Martzel | |
| 2009/0126745 A1* | 5/2009 | Hon | 131/273 |
| 2009/0151717 A1 | 6/2009 | Bowen et al. | |
| 2009/0188490 A1 | 7/2009 | Han | |
| 2009/0230117 A1 | 9/2009 | Fernando et al. | |
| 2009/0272379 A1 | 11/2009 | Thorens et al. | |
| 2009/0283103 A1* | 11/2009 | Nielsen et al. | 131/273 |
| 2009/0320863 A1* | 12/2009 | Fernando et al. | 131/194 |
| 2010/0163063 A1 | 7/2010 | Fernando et al. | |
| 2010/0307518 A1* | 12/2010 | Wang | 131/329 |
| 2010/0313901 A1* | 12/2010 | Fernando et al. | 131/330 |
| 2011/0094523 A1 | 4/2011 | Thorens et al. | |
| 2011/0120482 A1* | 5/2011 | Brenneise | 131/328 |
| 2011/0126848 A1 | 6/2011 | Zuber et al. | |
| 2011/0147486 A1 | 6/2011 | Greim et al. | |
| 2011/0155151 A1 | 6/2011 | Newman et al. | |
| 2011/0155153 A1 | 6/2011 | Thorens et al. | |
| 2011/0155718 A1 | 6/2011 | Greim et al. | |
| 2011/0209717 A1 | 9/2011 | Han | |

FOREIGN PATENT DOCUMENTS

| | | | |
|---|---|---|---|
| DE | 3 640 917 A1 | 8/1988 | |
| DE | 3 711 234 | 10/1988 | |
| DE | 3 735 704 A1 | 5/1989 | |
| DE | 19854005 A1 | 5/2000 | |
| DE | 19854009 A1 | 5/2000 | |
| EP | 0 239 802 A2 | 10/1987 | |
| EP | 0 277 519 A2 | 8/1988 | |
| EP | 0 295 122 A2 | 12/1988 | |
| EP | 0358002 A2 | 3/1990 | |
| EP | 0438862 A2 | 7/1991 | |
| EP | 0503767 A1 | 9/1992 | |
| EP | 1 989 946 A1 | 11/2008 | |
| EP | 1989946 A1 * | 11/2008 | A24F 47/00 |
| EP | 2110033 A1 | 10/2009 | |
| EP | 2110034 A1 * | 10/2009 | |
| EP | 2113178 A1 | 11/2009 | |
| GB | 2 148 676 | 5/1985 | |
| JP | 2006-320286 A | 11/2006 | |
| KR | 100636287 B1 | 10/2006 | |
| WO | WO 86/02528 | 4/1986 | |
| WO | WO 95/02970 | 2/1995 | |
| WO | WO 95/27411 A1 | 10/1995 | |
| WO | WO 95/27412 | 10/1995 | |
| WO | WO 98/23171 | 6/1998 | |
| WO | WO 00/28843 A1 | 3/2000 | |
| WO | WO 2004/043175 A1 | 5/2004 | |
| WO | WO 2004/080216 | 9/2004 | |
| WO | WO 2004/095955 | 11/2004 | |
| WO | WO 2005/099494 | 10/2005 | |
| WO | WO 2007/042941 A2 | 4/2007 | |
| WO | WO 2007/0066374 | 6/2007 | |
| WO | WO 2007/066374 A1 | 6/2007 | |
| WO | WO 2007/066167 A1 | 7/2007 | |
| WO | WO 2007/078273 A1 | 7/2007 | |
| WO | 2007/098337 A2 | 8/2007 | |
| WO | WO 2007098337 A2 * | 8/2007 | |
| WO | WO 2007/131449 A1 | 11/2007 | |
| WO | WO 2007/131450 A1 | 11/2007 | |
| WO | WO 2008/015441 A1 | 2/2008 | |
| WO | WO 2008/055423 | 5/2008 | |
| WO | WO 2010/091593 | 8/2010 | |
| WO | WO 2010/145468 | 12/2010 | |

OTHER PUBLICATIONS

"Excerpt from 'NASA Tech Briefs'," Jul./Aug. 1988, p. 31.

"Joining of Ceramics" by R.E. Loehman et al., published in Ceramic Bulletin, 67(d); 375-380 (1988).

Oxidation Behavior of Silver-and Copper-Based Brazing Filler Metals for Silicon Nitride/Metal Joints by R.R. Kapoor et al., published in J. Am. Ceram. Soc., 72(3):448-454 (1989).

"Brazing Ceramic Oxides to Metals at Low Temperatures" by J.P. Hammond et al., published in Welding Research Supplement, 227-232-s, (1988).

"Brazing of Titanium-Vapor-Coated Silicon Nitride" by M. L. Santella, published in Advanced Ceramic Materials, 3(5):457-465 (1988).

"Microstructure of Alumina Brazed with a Silver-Cooper-Titanium Alloy" by M.L. Santella et al., published in J. Am. Ceram. Soc., 73(6):1785-1787 (1990).

John A. Dean, Lange's handbook of Chemistry, 12th Edition, 1978 pp. 4-16, 4-123.

Fen et al., "Cyclic oxidation of Haynes 230 alloy", Chapman & Hall, pp. 1514-1520 (1992).

Reinshagen and Sikka, "Thermal Spraying of Selected Aluminides", Proceedings of the Fourth National Thermal Spray Conference, Pittsburgh, PA USA, pp. 307-313 (May 4-10, 1991).

Kutner, "Thermal spray by design", Reprint from Advanced Materials & Processes Incorporating Metal Progress, Oct. 1988.

"Characterizing Thermal Spray Coatings", Article based on presentation made at the Fourth National Thermal Spray Conference, May 4-10, 1991 and appearing in Advanced Materials and Processes, May 1992, pp. 23-27.

Howes, Jr., "Computerized Plasma Control for Applying Medical-Quality Coatings", Industrial Heaing, pp. 22-25, Aug. 1993.

V. Sikka, "Processing of Aluminides", Intermetallic Metallurgy and Processing Intermetallic Compounds, ed Stoloff et al., Van Mestrand Reinhold, N.Y., 1994.

Brezovich, "Temperature Distributions in Tumor Models Heated by Self-Regulating Nickel-Copper Alloy Thermoseeds," Mar./Apr. 1984, pp. 145-152.

Duarte, "A Design Procedure for a Self Oscillating Hybrid Inverter," 1991, pp. 350-355.

Gorbachev, "Compensation of Varying Load in a Thyristor," v. 56, No. 3, pp. 27-28.

Matthes, "Thyristorised Conerters for Inductive Heating for Hot Forging," 1975, pp. 80-86.

Stauffer, "Observations on the Use of Ferromagnetic Implants for Inducing Hypothermia" 1984, pp. 76-90.

Katagiri, "Rapid Reinforcement for Fusion Mass spliced Fibers using Low-Power," Jun. 1, 1985, pp. 1708-1712.

* cited by examiner

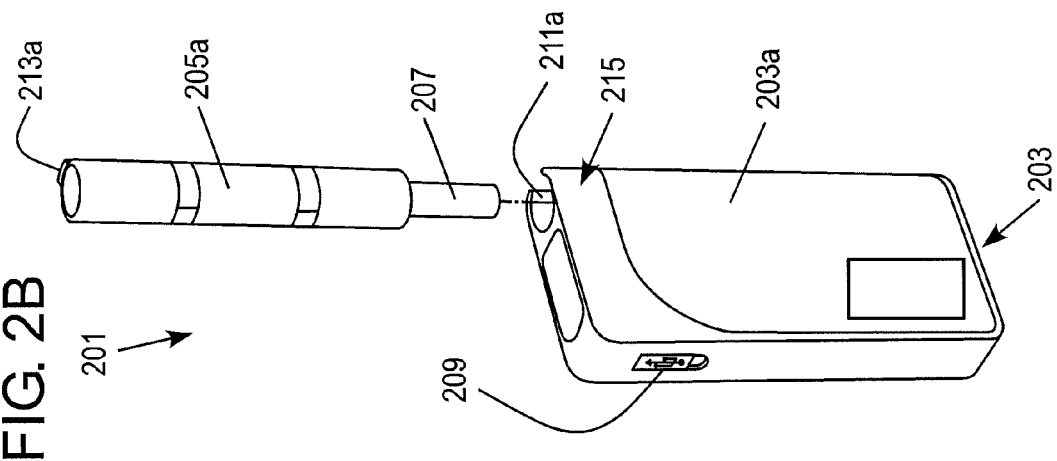
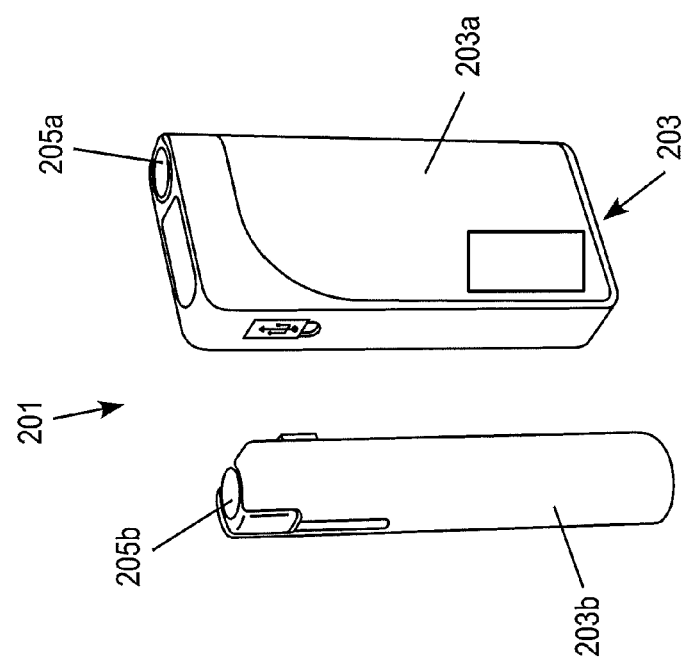

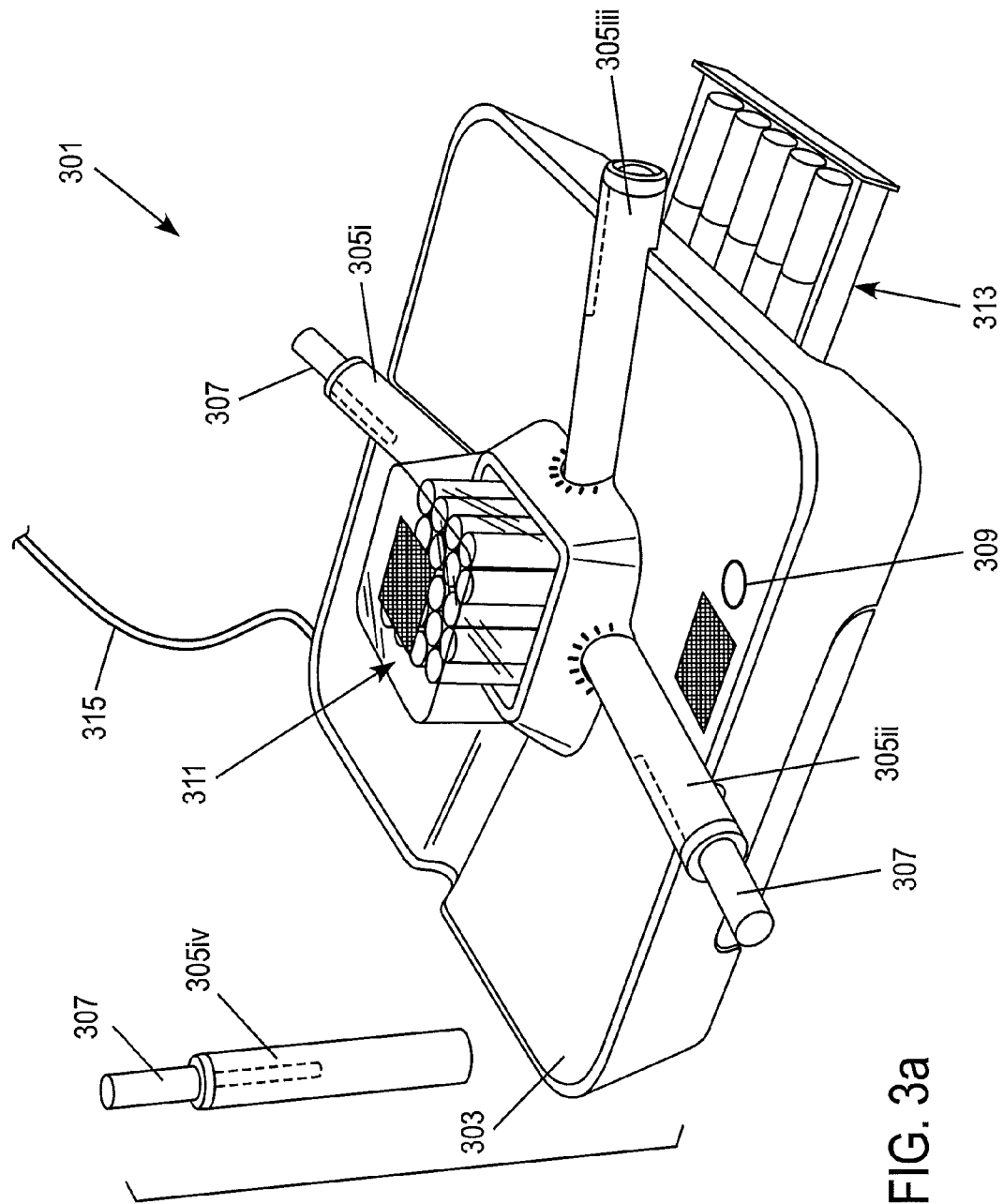

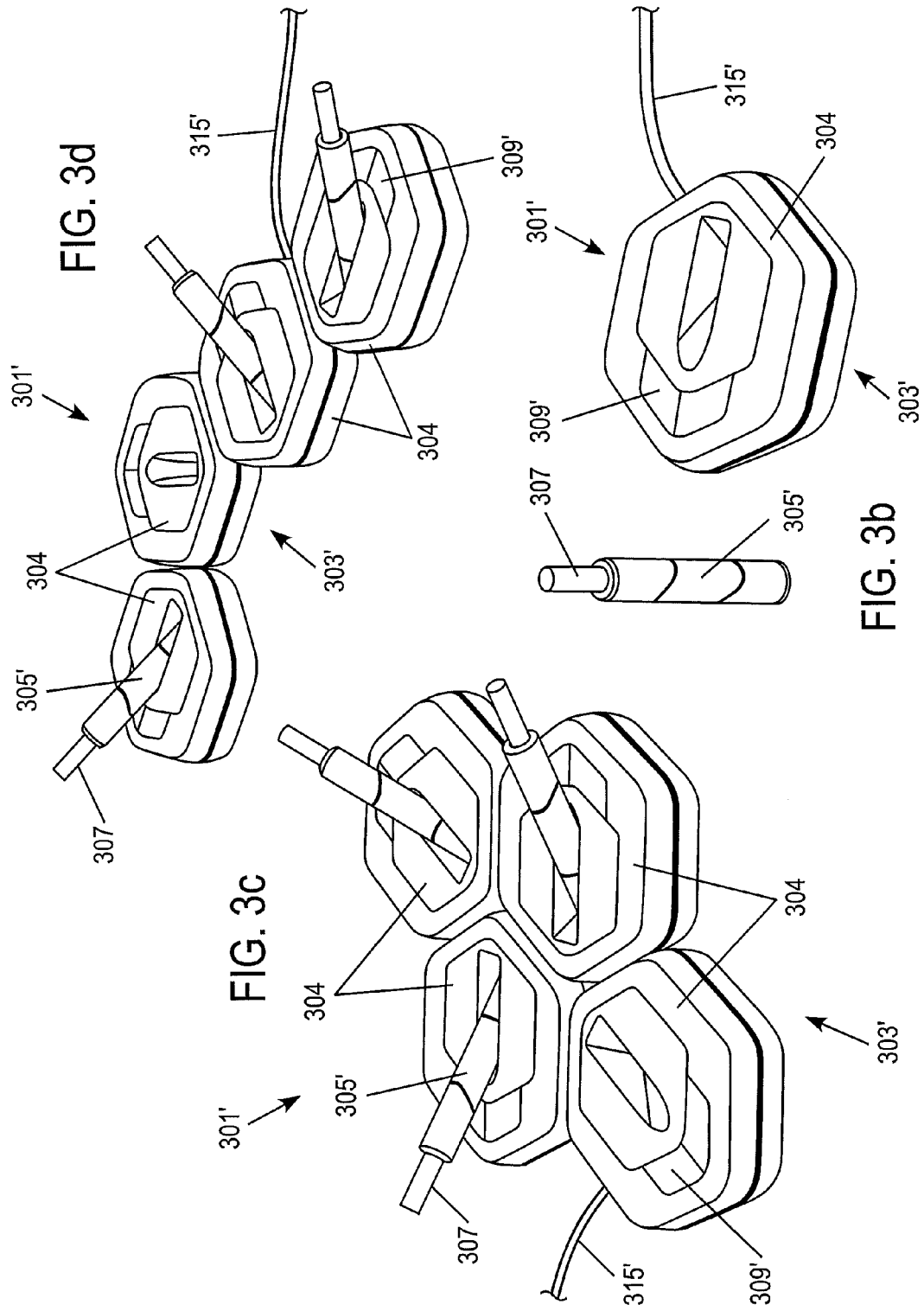

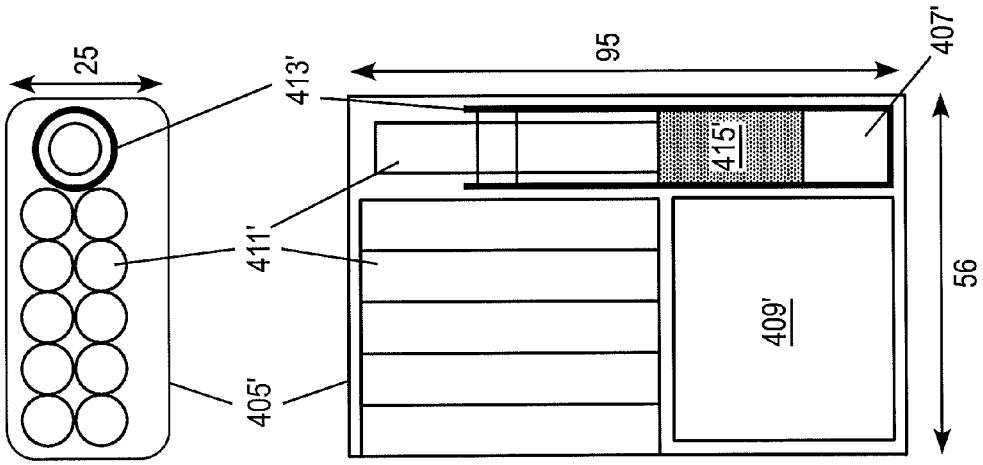
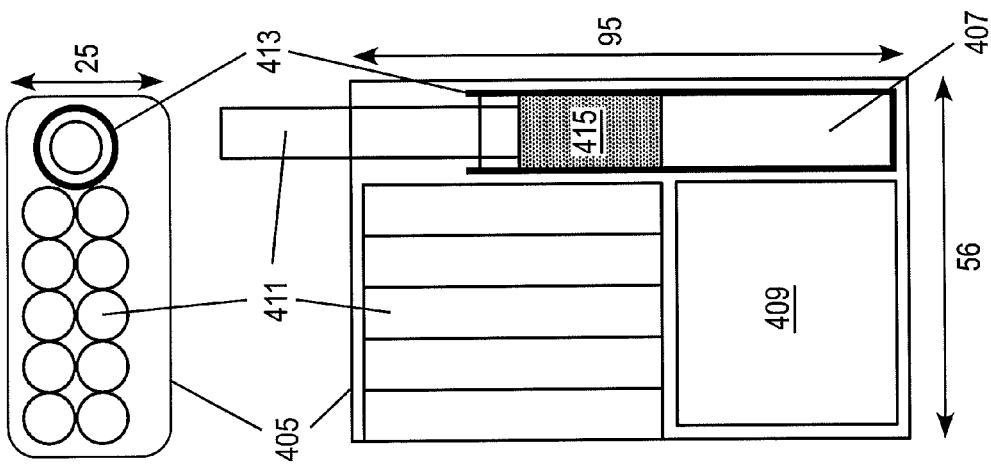
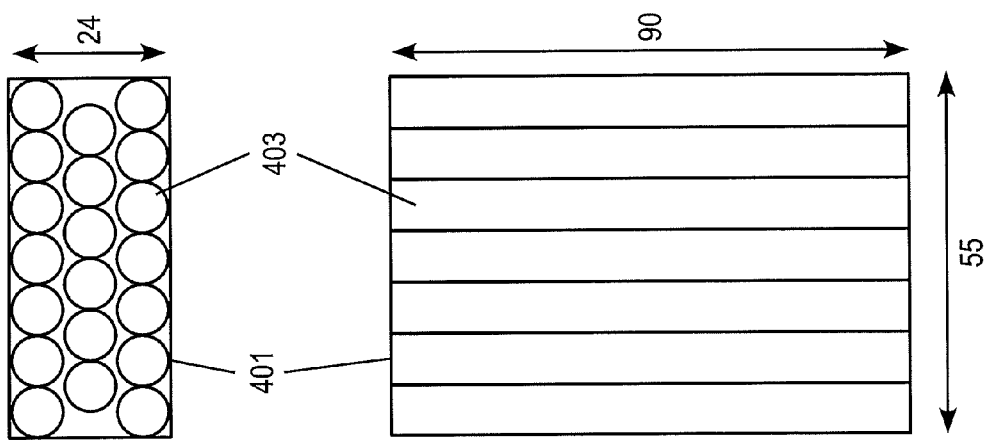

ELECTRICALLY HEATED SMOKING SYSTEM

CROSS-REFERENCE TO RELATED APPLICATION

This application claims priority to European Application No. 09251364.7, filed May 21, 2009, the entire content of which is incorporated herein by this reference thereto.

BACKGROUND

A number of prior art documents disclose electrically operated smoking systems, having a number of advantages. One advantage is that they significantly reduce sidestream smoke, while permitting the smoker to selectively activate the smoking system during the smoking experience. The electrically operated smoking systems of the prior art typically include a housing for receiving a smoking article, heating elements to generate an aerosol, a power source and the necessary electronic circuitry. The circuitry may be activated manually or by insertion of a cigarette into the housing, and may limit operation of the heating elements to a pre-defined time period.

Some of the electrically operated smoking systems of the prior art have disadvantages, however. It would be advantageous if the devices could be made smaller and more convenient for the smoker, so that the size is closer to that of a lit-end cigarette and the device can be held between the fingers of a smoker in a similar way to a lit-end cigarette.

The present invention relates to an electrically heated smoking system having a unit for receiving a smoking article, wherein the unit includes a secondary power supply and the unit is connectable to a primary power supply.

SUMMARY

In a preferred embodiment, an electrically heated smoking system includes a secondary unit capable of receiving a smoking article having an aerosol-forming substrate. Preferably, the secondary unit includes (i) at least one heating element, (ii) an interface for connection to a primary power supply for supplying electrical power to the at least one heating element during a pre-heating mode, to increase the temperature of the aerosol-forming substrate to an operating temperature, (iii) a secondary power supply arranged to supply electrical power to the at least one heating element during a smoking mode, to maintain the temperature of the aerosol-forming substrate at substantially the operating temperature, and (iv) secondary circuitry.

Preferably, the secondary power supply is chargeable by the primary power supply during a charging mode so that the secondary power supply has sufficient charge to maintain the temperature of the aerosol-forming substrate at substantially the operating temperature during the smoking mode. Also preferably, the interface provides bi-directional communication between the secondary unit and an intelligent device. Moreover, the supply of electrical power from the primary power supply to the at least one heating element, during the pre-heating mode, is controlled by the secondary circuitry.

In the preferred embodiment, the electrically heated smoking system also includes a primary unit including the primary power supply and primary circuitry. Preferably, the supply of electrical power from the primary power supply in the primary unit to the at least one heating element, during the pre-heating mode, is controlled by the primary circuitry in the primary unit. Also preferably, the primary unit includes an interface for connection to an external power supply for supplying electrical power to the primary power supply. The electrically heated smoking system can also include a plurality of secondary units. Preferably, the primary unit includes a plurality of connectable modules, each module including a docking port for a respective secondary unit. Also preferably, the primary unit includes storage means for one or more secondary units. Moreover, the primary unit includes storage means for at least one smoking article. In the preferred embodiment, the primary unit includes a base portion and a lid portion. Preferably, the supply of electrical power from the secondary power supply to the at least one heating element, during the smoking mode, is controlled by the secondary circuitry. Also preferably, the secondary unit is insulated. Moreover, the primary unit includes a primary power supply and primary circuitry.

BRIEF DESCRIPTION OF THE DRAWINGS

The invention will be further described, by way of example only, with reference to the accompanying drawings.

FIGS. 2a and 2b show two alternative views of a second embodiment of the present invention.

FIGS. 3a, 3b, 3c, and 3d show four versions of a third embodiment of the present invention.

FIGS. 4a, 4b and 4c show two embodiments of the smoking system of the present invention in comparison with a pack of lit-end cigarettes.

DETAILED DESCRIPTION

Figure 1A:
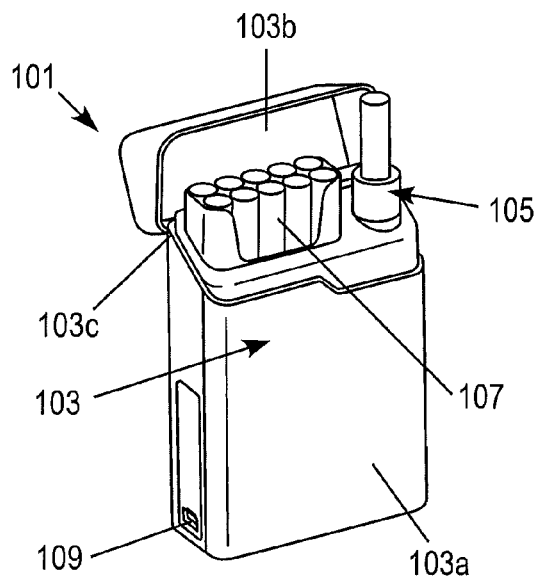
FIGS. 1a, 1b, and 1c show three versions of a first embodiment of the present invention.

In a preferred embodiment, an electrically heated smoking system includes a secondary unit capable of receiving a smoking article having an aerosol-forming substrate. Preferably, the secondary unit includes at least one heating element, an interface for connection to a primary power supply for supplying electrical power to the at least one heating element during a pre-heating mode, to increase the temperature of the aerosol-forming substrate to an operating temperature, a secondary power supply arranged to supply electrical power to the at least one heating element during a smoking mode, to maintain the temperature of the aerosol-forming substrate at substantially the operating temperature, and secondary circuitry.

In the preferred embodiment, the secondary unit is designed to receive a smoking article and be held by a smoker during the smoking experience. Moreover, the power supply in the secondary unit maintains the temperature of the aerosol-forming substrate during the smoking experience. Preferably, the secondary unit connects to a primary power supply, which is used to heat up the aerosol-forming substrate to operating temperature before smoking begins. Also preferably, the primary power supply may form part of a primary unit, which is separate from the secondary unit.

By providing a secondary power supply in the secondary unit and a separate, external primary power supply (that is, by dividing the power supply for the smoking system between a primary power supply and a secondary power supply in the secondary unit), the size of the secondary unit can be reduced without increasing the time needed to pre-heat the substrate. Preferably, the secondary unit is only slightly larger than the smoking article. The secondary unit is preferably of a similar size to or slightly larger than a lit-end cigarette. Thus, the secondary unit can be held between the smoker's fingers in a similar way to a lit-end cigarette.

Preferably, the secondary power supply is chargeable by the primary power supply, during a charging mode, so that the secondary power supply has sufficient charge to maintain the temperature of the aerosol-forming substrate at substantially the operating temperature during the smoking mode.

Preferably, supply of electrical power from the primary power supply to the at least one heating element, during the pre-heating mode, is controlled by the secondary circuitry in the secondary unit. Also preferably, supply of electrical power from the primary power supply, during the charging mode, to charge the secondary power supply, is controlled by the secondary circuitry in the secondary unit.

In the preferred embodiment, the interface for connection to the primary power supply allows power to be supplied from the primary power supply to the secondary unit during the pre-heating mode and, optionally, during the charging mode. For that purpose, the connection may be a wired connection such as a Universal Serial Bus (USB) connection or coaxial cable. A USB connection is advantageous because a USB communications link provides bi-directional communication and also a power link (usually 5 V).

The interface may alternatively or additionally facilitate other functionality and features for the smoking system. For that purpose, the connection may be a wired connection (such as a USB connection) or a wireless connection (such as a Bluetooth connection). Preferably, the interface facilitates bi-directional communication between the secondary unit and an intelligent device or host that has its own computing capability and is capable of acting as the primary power supply. This may allow data to be downloaded from the intelligent device or host to the secondary unit and data to be uploaded from the secondary unit to the intelligent device or host.

Preferably, the connection operates under an interface standard. An interface standard is a standard that describes one or more functional characteristics, such as code conversion, line assignments, or protocol compliance, or physical characteristics, such as electrical, mechanical, or optical characteristics, necessary to allow the exchange of information between two or more systems or pieces of equipment. Examples of suitable interface standards for the communications link include, but are not limited to, the Recommended Standard 232 (RS-232) family of standards; USB; Bluetooth; FireWire (a brand name of Apple, Inc., for their IEEE 1394 interface), IrDA (Infrared Data Association—a communications standard for the short-range exchange of data by Infrared light); Zigbee (a specification based on the IEEE 802.15.4 standard for wireless personal area networks); and other Wi-Fi standards.

Preferably, the secondary circuitry is programmable. The secondary circuitry may be programmable such that the secondary unit can be personalized to an individual smoker's smoking behaviour. For example, the secondary circuitry may be programmable to adjust the electrical power supplied to the at least one heating element during the smoking mode based on the particular smoker using the secondary unit, the particular smoking article contained in the secondary unit or both.

In the preferred embodiment, the primary power supply may be located in an external intelligent device or host such as a computer. Moreover, the host may be a personal computer. Preferably, the personal computer may be a desktop computer. Alternatively, the personal computer may be a laptop computer or a notebook computer. Moreover, the personal computer may be a tablet computer such as a Personal Digital Assistant (PDA), a Personal Information Device (PID), a Portable Media Player (PMP, such as an Apple, Inc., iPod®) or a Portable Video Player (PVP). The host may be a mobile cellular telephone. Additionally, the external host may be Internet-enabled. That is, preferably the external host, such as a computer, can connect to one or more Internet sites in order to upload data or download data or both upload and download data. This allows extended features to be implemented from the Internet via the computer, at the same time as keeping the hardware in the system itself relatively simple. Throughout the specification, in the context of the present invention, the term "Internet" is used to refer to the worldwide, publicly accessible series of interconnected computer networks that transmit data using the standard Internet Protocol (IP). It includes the World Wide Web (www) but also includes other domestic, academic, business, government and other networks outside the World Wide Web.

The primary power supply may simply be an external power source such as the commercial power supply (also known as mains power, household power, domestic power, wall power or grid power). That is to say, the interface on the secondary unit may be connectable to a wall socket. The primary power supply may be an in-vehicle power supply, for example, in a car. That is to say, the interface on the secondary unit may be connectable to a charging socket in a vehicle.

Figure 6:
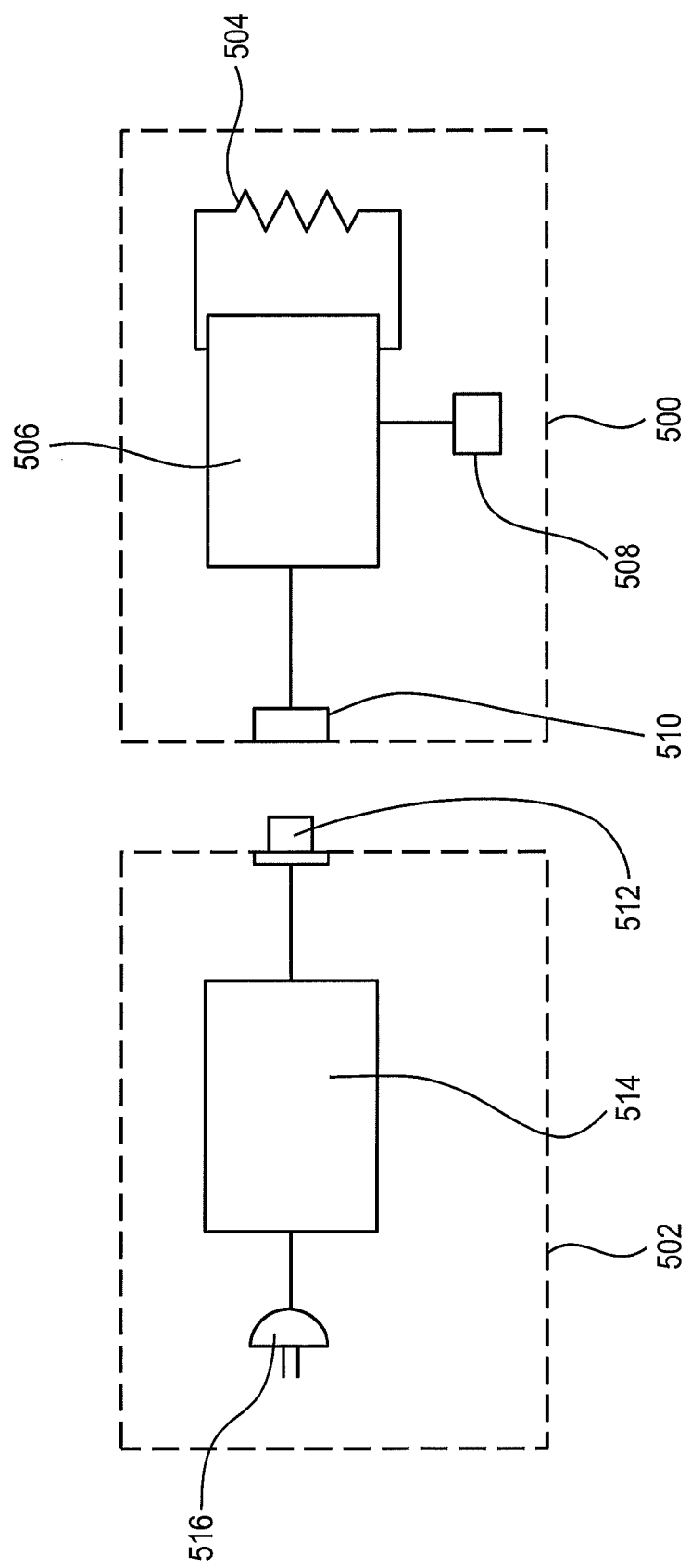
FIG. 6 is a schematic illustration.

In a preferred embodiment, the electrically heated smoking system further includes a primary unit including the primary power supply 516 and primary circuitry 514 (shown in FIG. 6). By providing a primary power supply in the primary unit and a secondary power supply in the secondary unit (that is, by dividing the power supply between the primary and secondary units), the size of the secondary unit can be reduced without increasing the time needed to preheat the substrate. In addition, all the components required for the smoking experience can be contained in a single unit of a size and shape similar to a pack of lit-end cigarettes.

In the preferred embodiment including a primary unit, the interface on the secondary unit may be for connection to the primary unit only, or to the primary unit and another external unit.

In the embodiment including a primary unit, preferably, supply of electrical power from the primary power supply in the primary unit to the at least one heating element, during the pre-heating mode, is controlled by the primary circuitry in the primary unit. Alternatively, supply of electrical power from the primary power supply in the primary unit to the at least one heating element, during the pre-heating mode, may be controlled by the secondary unit. Preferably, supply of electrical power from the primary power supply in the primary unit to charge the secondary power supply is controlled by the primary circuitry in the primary unit. Alternatively, supply of electrical power from the primary power supply in the primary unit to charge the secondary power supply may be controlled by the secondary circuitry in the secondary unit. All functions may be controlled by either the secondary unit or the primary unit or by a combination of both units.

In one embodiment, the primary unit includes an interface for connection to an external power supply for supplying electrical power to the primary power supply. The interface in the primary unit may allow power to be supplied from an external power supply to the primary power supply during the pre-heating mode, during the charging mode, during the smoking mode, when the smoking system is not in use or at any combination of those times. For that purpose, the connection may be a wired connection such as a USB connection or coaxial cable.

The interface in the primary unit may alternatively or additionally facilitate other functionality and features for the smoking system. For that purpose, the connection may be a wired connection (such as a USB connection) or a wireless connection (such as a Bluetooth connection). Preferably, the interface facilitates bi-directional communication between the primary unit and an intelligent device or host. The features described above in relation to the interface in the secondary unit also apply to the interface in the primary unit.

In the preferred embodiment, the external power supply may be located in an intelligent device or host such as a computer. As already discussed, the computer may be Internet-enabled and the interface in the primary unit may allow Internet data to be downloaded from the host and uploaded to the host.

Alternatively, the external power supply may simply be a power source such as the commercial power supply.

Preferably, the primary circuitry is programmable. If the primary power supply is chargeable by an external power supply, preferably, the primary circuitry controls charging of the primary power supply. If the primary unit includes an interface for connection to an external host, preferably, the primary circuitry controls communication between the primary unit and the external host.

When a primary unit is included, the electrically heated smoking system includes one, and only one, secondary unit. This is advantageous as it is designed for a single smoker. In a preferred embodiment, the primary unit includes storage means for the single secondary unit to form a single compact unit. Preferably, the single compact unit is easily transportable by the smoker.

In an alternative embodiment which includes a primary unit, the electrically heated smoking system includes two, and only two, secondary units. Such an embodiment is advantageous as it is designed to be shared by two smokers. In the preferred embodiment, the primary unit includes storage means for the two secondary units to form a single compact unit. Also preferably, the primary unit includes a first module for receiving a first secondary unit and a second module for receiving a second secondary unit. Each module may include some or all of the functionality of the primary unit.

In an alternative embodiment which includes a primary unit, the electrically heated smoking system includes more than two secondary units. Such an embodiment is advantageous as it is designed to be shared by a plurality of smokers. Moreover, the primary unit includes storage means for the plurality of secondary units. Preferably, the primary unit includes a plurality of docking ports to receive respective secondary units for connection during the pre-heating mode and, optionally, during the charging mode.

When the electrically heated smoking system includes two or more secondary units, the primary unit may include a plurality of connectable modules, each module including a docking port for a respective secondary unit. This allows two or more smokers to form a single primary unit including a nest or chain of modules.

Preferably, the primary unit includes storage means for one or more secondary units. This is advantageous since the primary unit and the secondary unit, when not in use, may form a single compact system, which may be easily transportable. The single compact system may be of a size and shape similar to a pack of lit-end cigarettes. Preferably, each secondary unit is removably attachable to a side of the primary unit. Alternatively, each secondary unit is receivable in a respective docking cavity in the primary unit. Moreover, the secondary units may be storable in the storage means when a smoking article is contained in the secondary unit. Alternatively, the secondary units may be storable in the storage means when a smoking article is not contained in the secondary unit. The storage means may also provide means for connecting the primary unit and the secondary unit for the pre-heating mode and to charge the secondary power supply.

Preferably, the primary unit includes storage means for at least one smoking article. The storage means may include storage for used smoking articles, unused smoking articles or both. This is advantageous since the primary unit and secondary unit together provide all the components required for the smoking mode. In the preferred embodiment in which the one or more secondary units are storable in the storage means and in which the primary unit includes storage for at least one smoking article, all the components required for the smoking experience can be contained in a single compact system. The single compact system may be of a size and shape similar to a pack of lit-end cigarettes. Additionally, or alternatively, the secondary unit may be capable of storing a smoking article when not in use. As used herein, the term "storage means" is used to indicate storage for one or more secondary units, storage for one or more smoking articles, or storage for both secondary units and smoking articles.

In a preferred embodiment, the primary unit includes a base portion and a lid portion connected to the base portion. The lid portion may be connected to the base portion by any suitable connection. For example, the lid portion may be connected to the base portion by a hinge. Alternatively, the lid portion may be a sliding lid. For example, the primary unit may include a shell portion and a slide portion arranged to slide relative to the shell portion. Alternatively, the lid portion may friction fit with the base portion. Moreover, the lid portion may screw fit with the base portion.

Preferably the base portion of the primary unit includes storage space for a plurality of smoking articles and storage space for at least one secondary unit. Moreover, the lid portion may be closable on the base portion when the secondary unit is stored in the base portion. Even more preferably, the lid portion may be closable on the base portion when the secondary unit is stored in the base portion and a smoking article is contained in the secondary unit. In the preferred embodiment, when smoking articles and a secondary unit are stored in the base portion and the lid portion is closed, the smoking system has a size and shape similar to that of a pack of lit-end cigarettes.

Also preferably, the primary unit may include a display (for example a digital display) indicating information to the smoker. For example, the display may indicate smoking article usage, energy usage or other information.

Preferably, supply of electrical power from the secondary power supply to the at least one heating element, during the smoking mode, is controlled by the secondary circuitry. During the smoking mode, the secondary circuitry may monitor the time elapsed of the smoking mode. In the preferred embodiment, the secondary unit may include a display (for example a digital display) indicating information to the smoker. For example, the display may indicate the time elapsed, the number of puffs taken, the number of puffs still remaining or other information. Preferably, the secondary circuitry is arranged to provide an output signal when the time elapsed is equal to a pre-determined period of time. Alternatively or in addition, the secondary circuitry may monitor the time elapsed between puffs during the smoking mode and provide an output signal when the time elapsed is equal to a pre-determined period of time, which is shorter than the pre-determined period of time for the smoking mode. Further, during the smoking mode, the secondary circuitry may monitor the number of puffs taken by a smoker. Preferably, the secondary circuitry is arranged to provide an output signal when the number of puffs taken is equal to a pre-determined number of puffs. Thus, there are three possible modes of operation. In a first mode, the smoking mode has a pre-determined maximum period of time. In a second mode, the smoking mode has a pre-determined maximum number of puffs. In a third mode, the smoking mode has a pre-determined maximum period of time between puffs.

As already mentioned, the secondary unit preferably has a diameter that is only slightly larger than the diameter of the smoking article. Additionally, the length of the secondary unit may be similar to the length of a lit-end cigarette (for example, a cigarette having a length of between approximately 70 mm and approximately 128 mm). Alternatively, the secondary unit may be longer or shorter. This is possible because the secondary power supply does not need to increase the temperature of the aerosol-forming substrate to an operating temperature but only needs to maintain the operating temperature. Thus, the secondary power supply can be relatively small. In the preferred embodiment, the smoking article used has a diameter and length that is smaller than a standard lit-end cigarette (for example, a cigarette with a diameter of approximately 7.9 mm and a length of approximately 85 mm) which allows the secondary unit to be of a similar size to a lit-end cigarette. This allows a smoker to hold the secondary unit between the smoker's fingers in a similar way to a lit-end cigarette.

Preferably, the secondary unit is insulated. This reduces heat loss from the secondary unit and allows the aerosol-forming substrate to be maintained at substantially the operating temperature for the desired period of time.

Also preferably, the secondary unit may include a base portion capable of receiving the smoking article and a cap portion for enclosing the smoking article or closing the base portion.

In the preferred embodiment, the aerosol-forming substrate includes a tobacco-containing material containing volatile tobacco flavor compounds which are released from the substrate upon heating. Alternatively, the aerosol-forming substrate may include a non-tobacco material such as those used in the devices of EP-A-1 750 788 and EP-A-1 439 876, which are hereby incorporated by reference thereto. Preferably, the aerosol-forming substrate further includes an aerosol former. Examples of suitable aerosol formers are glycerine and propylene glycol. Additional examples of potentially suitable aerosol formers are described in EP-A-0 277 519 and U.S. Pat. No. 5,396,911, which are hereby incorporated by reference thereto.

In the preferred embodiment, the aerosol-forming substrate may be a solid substrate. The solid substrate may include, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco. Optionally, the solid substrate may contain additional tobacco or non-tobacco volatile flavor compounds, to be released upon heating of the substrate. Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, such as those disclosed in U.S. Pat. No. 5,505,214, U.S. Pat. No. 5,591,368 and U.S. Pat. No. 5,388,594, the contents of which are hereby incorporated by this reference thereto, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix. Preferably, the solid substrate may be deposited on the surface of the carrier in the form of, for example, a sheet, foam, gel or slurry. Moreover, the solid substrate may be deposited on the entire surface of the carrier, or alternatively, may be deposited in a pattern in order to provide a non-uniform flavor delivery during use. Alternatively, the carrier may be a non-woven fabric or fiber bundle into which tobacco components have been incorporated, such as that described in EP-A-0 857 431, the entire content of which is incorporated herein by reference thereto. Moreover, the non-woven fabric or fiber bundle may include, for example, carbon fibers, natural cellulose fibers, or cellulose derivative fibers.

Preferably, the aerosol-forming substrate may be a liquid substrate and the smoking article may include means for retaining the liquid substrate. The aerosol-forming substrate may alternatively be any other sort of substrate, for example, a gas substrate, or any combination of the various types of substrate.

A primary unit for the electrically heated smoking system of the first aspect of the invention, the primary unit including a primary power supply and primary circuitry is also provided herein. However, it should be noted that features described in relation to one aspect of the invention may also be applicable to another aspect of the invention.

In general, the electrically heated smoking system does not require the primary unit, in which case the secondary unit may be a standalone unit connectable to an existing external power supply. However, as discussed above, in the preferred embodiment, the electrically heated smoking system includes a primary unit and one or more secondary units capable of receiving a smoking article. Preferably, the primary unit includes a primary power supply and electronic circuitry. Moreover, the secondary unit includes a secondary power supply, electronic circuitry and at least one heating element. Also preferably, the primary power supply in the primary unit may be used for charging the secondary power supply in the secondary unit, in the charging mode, and for the initial heating of the aerosol-forming substrate of the smoking article, in the pre-heating mode. Once the temperature of the aerosol-forming substrate is raised to an operating temperature, the secondary power supply in the secondary unit is used to maintain the temperature of the substrate during the smoking experience, in the smoking mode. The required operating temperature will depend upon the particular aerosol-forming substrate in the smoking article. Preferably, the operating temperature is controlled by the primary power supply, the number and type of heating elements and the structure of the secondary unit. By dividing the power supply between the primary unit and the secondary unit, the size of the secondary unit can be reduced, such that it is only slightly larger than the smoking article. In addition, in some embodiments, all the components required for the smoking experience can be contained in a single unit of a size and shape similar to a pack of lit-end cigarettes. Various embodiments will now be described and features described in relation to any embodiment may equally be applicable to any of the other embodiments.

Figure 1B:
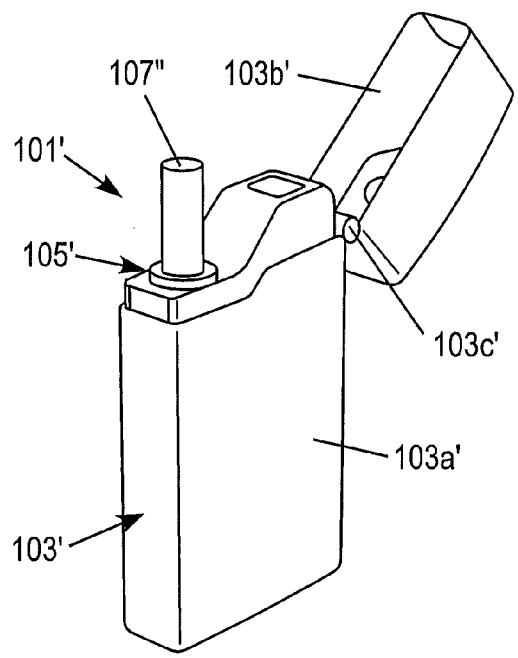
Figure 1C:
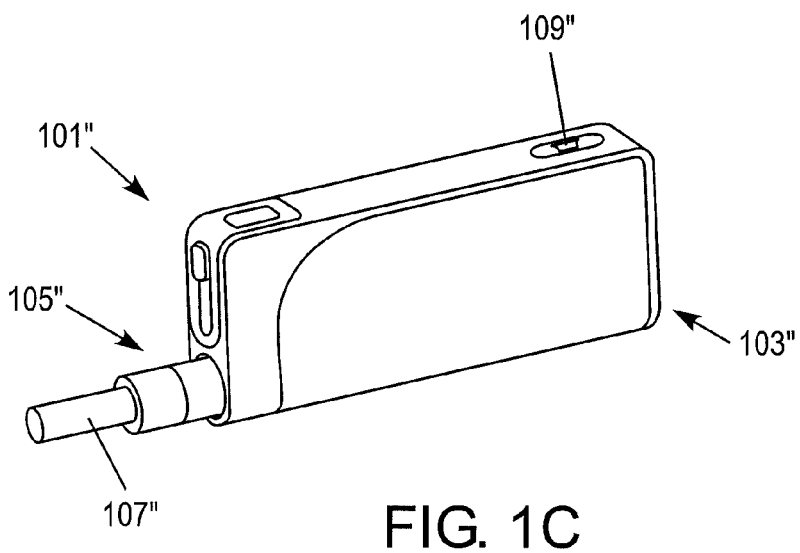

FIGS. 1a, 1b and 1c each show a version of a first embodiment of the electrically heated smoking system. As shown in FIGS. 1a and 1b, the primary unit is in the form of a hinge lid box of a size and shape similar to a standard pack of lit-end cigarettes. Other pack configurations are discussed below with reference to FIG. 4a. Although not expressly shown, the primary unit may be another suitable size.

In FIG. 1a, smoking system 101 includes primary unit 103 and secondary unit in the form of holder 105. In the preferred embodiment, the primary unit 103 has the form of a hinge lid box, with a base portion 103a and a lid portion 103b, separated by a hinge 103c. The lid portion 103b is shown open in FIG. 1a. Preferably, the hinge 103c runs along a long edge of the top side of the base portion 103a. Also preferably, the holder 105 can be stored in the base portion 103a of the primary unit 103 (as shown in FIG. 1a) by insertion into a docking port. As shown in FIG. 1a, the docking port for holder 105 is provided at one side of the base portion 103a, but the docking port could equally be provided on the opposite side of the base portion 103a or in the centre of the base portion 103a. In the embodiment of FIG. 1a, when the holder 105 is stored in the primary unit 103, the top of the holder 105 protrudes above the top side of the base portion 103a. Preferably, the lid portion 103b is, nonetheless, able to close onto the base portion 103a when the holder 105 is stored in the primary unit 103, including when a smoking article is contained in the holder 105. Alternatively, the top unit of the holder 105 may be virtually flush with the top side of the base portion 103a. Moreover, the primary unit 103 also has storage for smoking articles 107, in this case to one side of the holder docking port. A further smoking article may, of course, be stored in the holder 105. Although not expressly shown, the docking port for holder 105 may be located on either side of the base portion 103a and the storage for smoking articles 107 may be located on the side opposite the holder 105. If the docking port for holder 105 is located towards the centre of the base portion 103a, storage for smoking articles 107 may be located on one or both sides of the docking port.

Additionally, in the base portion 103a of the primary unit 103 of FIG. 1a, there is an interface 109 for receiving a USB plug (not shown). The USB connection may be used for charging the power supply in the primary unit, for checking the functionality or for other purposes where connection to a computer is required. Such a USB interface, or indeed any other suitable interface, may be included on any of the described embodiments. Additionally or alternatively, a USB interface, or any other suitable interface, may be included on the holder, although this is not shown in FIG. 1a. The USB connection will be discussed further below.

In FIG. 1b, smoking system 101' includes primary unit 103' and secondary unit in the form of holder 105'. As in FIG. 1a, the primary unit 103' has the form of a hinge lid box, with a base portion 103a' and a lid portion 103b', separated by a hinge 103c'. However, in FIG. 1b, the hinge runs along a short edge of the top side of the base portion 103a'. The lid portion 103b' is shown open in FIG. 1b. Preferably, the holder 105' can be stored in the base portion 103a' of the primary unit 103' (as shown in FIG. 1b) by insertion into a docking port. In FIG. 1b, the docking port for holder 105' is provided towards the front of the base portion 103a', that is, furthest from the hinge 103c', but the docking port could equally be provided towards the rear end of the base portion 103a', that is, closest to the hinge 103c', or in the centre of the base portion 103a'. In the embodiment of FIG. 1b, when holder 105' is stored in the primary unit 103', the top of the holder 105' may be virtually flush with the top side of the base portion 103a'. Preferably, the lid portion 103b' is able to close onto the base portion 103a', including when a smoking article is contained in the holder 105'. Alternatively, the top of the holder 105' may protrude above the top side of the base portion 103a'. The primary unit 103' also has storage for smoking articles 107, in this case, towards the rear of the base portion 103a', that is, nearer to the hinge 103c'. A further smoking article may, of course, be stored in the holder. If the docking port 105' is located towards the rear of the base portion 103a', the storage for smoking articles 107' may be located at the end opposite the holder 105', that is towards the front of the base portion 103a'. If the docking port for holder 105' is located towards the centre of the base portion 103a', storage for smoking articles 107' may be located at one or both ends of the base portion 103a'.

In FIG. 1c, smoking system 101" includes primary unit 103" and secondary unit in the form of holder 105". The holder 105" can be stored in the primary unit 103" (as shown in FIG. 1c) by insertion into a docking port. In FIG. 1c, the docking port for holder 105" is provided at one side of the base portion 103a", but the docking port could equally be provided on the opposite side of the base portion 103a" or in the centre of the base portion 103a". Preferably, the primary unit 103" and holder 105" together form a single compact unit. In the embodiment of FIG. 1c, when the holder 105" is stored in the primary unit 103", the top of the holder 105" protrudes above the top side of the primary unit 103". Alternatively, the top unit of the holder 105" may be virtually flush with the top side of the primary unit 103". In the embodiment of FIG. 1c, the primary unit 103" does not have any storage for smoking articles, although a single smoking article may be stored in the holder 105". However, additional storage for smoking articles could be provided. Additionally, as in FIG. 1a, an interface 109" is provided in the primary unit 103" for receiving a USB plug (not shown).

In the embodiments shown in FIGS. 1a, 1b and 1c, the smoking system includes a primary unit and one separate holder. Preferably, the smoking system is designed for a single smoker. Moreover, the holder may be stored in the primary unit. In the preferred embodiment, a smoking article may be received in the holder when the holder is stored in the primary unit or when the holder is separate from the primary unit. When the holder is connected to the primary unit, the primary power supply may be connected to the heating elements, in order to heat the substrate in the pre-heating mode. Additionally, the primary unit may provide storage for smoking articles. The storage for smoking articles may be sized to store between 1 and 20 smoking articles in any suitable configuration. The holder and primary unit together form a compact smoking system that can easily be carried by a smoker. The various features of FIGS. 1a, 1b and 1c are interchangeable.

FIGS. 2a and 2b show alternative views of a second embodiment of the smoking system of the invention. In FIGS. 2a and 2b, smoking system 201 includes primary unit 203 including a main part 203a and a separable docking port 203b, and two secondary units in the form of holders 205a and 205b. Each holder 205a, 205b may be received in the primary unit 203. In the embodiment of FIGS. 2a and 2b, first holder 205a may be received in a docking port which is integral with the main part 203*a* of the primary unit 203. Second holder 205*b* may be received in docking port 203*b*, which is separate from the main part 203*a* of the primary unit 203, but may be attached to one side of the main part 203*a* via interface 209. Alternative connections between the docking port 203*b* and the main part 203*a* of the primary unit 203 are, of course, possible. Docking port on main part 203*a* includes a recess 211*a* which is designed to cooperate with a protrusion 213*a* on holder 205*a*, for securing the holder 205*a* in the docking port 203. Similarly, holder 205*b* includes a protrusion 213*b* for cooperation with a recess 211*b* in the docking port 203*b*, which is separate from the main part 203*a* of the primary unit 203. In addition, a mechanism may be provided for securing a smoking article in the holder.

As shown in FIG. 2*a*, the holders 205*a* and 205*b* are received in their respective docking ports, and docking port 203*b* is separate from the main part 203*a* of the primary unit 203. As shown in FIG. 2*b*, the holders 205*a* and 205*b* are separate from their respective docking ports and in use with a smoking article 207.

In the embodiment shown in FIGS. 2*a* and 2*b*, the smoking system includes a primary unit and two separate holders. Moreover, the smoking system is designed to be shared by two smokers. Alternatively, the smoking system can be used by a single smoker, in which case one of the holders acts as a back-up. Holder 205*a* can be stored directly in main part 203*a* of the primary unit. Holder 205*b* can be stored in docking port 203*b* which is attachable to the main part 203*a* of the primary unit 203. The holders and primary unit together form a compact smoking system. In the preferred embodiment, a smoking article may be received in each holder when that holder is connected to the primary unit or when the holder is separate from the primary unit. Additionally, the primary unit may provide storage for smoking articles, although this is not shown in FIG. 2*a* or 2*b*.

FIGS. 3*a* and 3*b* each show a version of a third embodiment of the invention. As shown in FIG. 3*a*, smoking system 301 includes primary unit 303 and a plurality of secondary units in the form of holders 305. As shown, three holders 305*i*, 305*ii* and 305*iii* are connected to the primary unit 303 and one holder 305*iv* is separate from the primary unit 303. In FIG. 3*a*, the primary unit 303 provides docking ports for four holders 305, but any number of docking ports could be provided. For example, as many or 40 or 50 docking ports may be provided. In other embodiments, between 2 and 10 holders may be docked in primary unit 303 for charging and pre-heating. Preferably, the primary unit 303 provides first storage 311 which may be used to store either smoking articles (used and unused) or holders, or both smoking articles and holders. Also preferably, the primary unit 303 provides second storage 313 which may also be used to store either smoking articles or holders, or both smoking articles and holders.

In FIG. 3*a*, holders 305*i* and 305*ii* are shown docked in primary unit 303. Preferably, the holders 305*i* and 305*ii* are each in use with a smoking article 307 and the power supply in the primary unit is being used for re-charging the power supply in the holder (charging mode), or for pre-heating the smoking article substrate (pre-heating mode). Holder 305*iii* is also shown docked in primary unit 303, but without a smoking article. Preferably, the power supply in the holder 305*iii* is being recharged from the power supply in the primary unit 303 (charging mode). Holder 305*iv* is shown separate from the primary unit 303 and in use with a smoking article 307. The power supply in holder 305*iv* is being used to maintain the operating temperature of the smoking article substrate (during the smoking mode).

In FIG. 3*a*, primary unit 303 is connected to an external power supply (not shown) via connection 315. The external power supply may be used for re-charging the power supply in the primary unit, for supplying power to the holders for charging the holders or during the pre-heating mode, or any combination of those.

In FIG. 3*a*, each docking port in primary unit 303 includes its own interface 309. This may include a display and a switch for initiating the pre-heating mode when a smoking article is received in the holder docked in the docking port.

In FIG. 3*b*, smoking system 301' includes a modular primary unit 303' and at least one secondary unit in the form of a holder 305'. Other configurations are shown in FIGS. 3*c* and 3*d*, which include multiple modules 304.

In the first configuration shown in FIG. 3*b*, the primary unit 303' includes a single module 304. The module 304 provides a docking port for a single holder 305'. Preferably, the holder 305' is separate from the module 304 of the primary unit 303' and can be used with a smoking article 307. Also preferably, the power supply in holder 305' is used to maintain the operating temperature of the smoking article substrate during the smoking mode. Moreover, the module 304 includes its own interface 309' for its docking port and may also include storage (not shown). Preferably, the primary unit 303' is connected to an external power supply (not shown) via connection 315'.

In a second configuration shown in FIG. 3*c*, the primary unit 303' includes four modules 304. Of course, any number of modules may be provided. Again, each module 304 provides a docking port for a single holder 305'. As shown, the four modules can be connected to one another in a "nest" formation. In the nest formation, each module may be connected to 1, 2, 3, 4, 5 or 6 other modules. Preferably, the connection between modules 304 may be a magnetic connection or any other type of suitable connection. Also shown are three holders 305' with smoking articles 307 docked in respective modules 304. The primary unit 303' can be being used for re-charging the power supply in each holder or for pre-heating the smoking article substrate. As in FIG. 3*a*, each module 304 includes its own interface 309' for its docking port and may also include storage (not shown). Preferably, the primary unit 303' is connected to an external power supply (not shown) via connection 315'. Note that only a single power connection is required for the primary unit 303', which provides power to all the modules 304.

As shown in FIG. 3*d*, in a third configuration the primary unit 303' includes four modules 304. Of course, again, any number of modules may be provided. Again, each module 304 provides a docking port for a single holder 305'. As shown, the four modules can be connected to one another in a "chain" formation. In the chain formation, each module may be connected to only 1 or 2 other modules. The connection between modules 304 may be a magnetic connection or any other type of suitable connection. Three holders 305' with smoking articles 307 are shown docked in respective modules 304 and the primary unit 303' is being used for re-charging the power supply in each holder or for pre-heating the smoking article substrate. As in FIGS. 3*b* and 3*c*, each module 304 includes its own interface 309' for its docking port and may also include storage (not shown). The primary unit 303' is connected to an external power supply (not shown) via connection 315'. Note that only a single power connection is required for the primary unit 303', which provides power to all the modules 304.

In the embodiments of FIGS. 3b, 3c, and 3d, each smoker may have their own holder 305' and module 304. As smokers join the group, new modules may be added to the configuration. As smokers leave the group, modules may be removed from the configuration.

In the embodiments shown in FIGS. 3a, 3b, 3c, and 3d, the smoking system can include at least one primary unit and a plurality of holders. Preferably, the smoking system is designed to be used by many smokers. Unlike the embodiments of FIGS. 1 and 2, the smoking system shown in FIG. 3a may not necessarily be transportable, and may be permanently positioned in a location accessible to a plurality of smokers.

Each of the embodiments shown in FIGS. 1 to 3 includes at least one primary unit and one or more secondary units. However, a primary unit need not be included in the smoking system. In that case, the holder will be connectable directly to an external power source, such as a mains supply, or a host computer. This may be via a wired connection such as a USB connection. Connection to an in-vehicle charging port is also possible. In that case, the holder will include the necessary electronic circuitry to control the charging in the charging mode, and the heating of the smoking article substrate in the pre-heating mode. Various features common to all the illustrated embodiments will now be described.

In the preferred embodiment, the power supply in the primary unit may be any suitable power supply. Preferably, the primary power supply may be chargeable by an external source. For example, the primary unit power supply may be a battery, such as a lithium ion, lithium iron phosphate, lithium manganese, nickel cadmium or nickel metal hydride battery. The external source may be an external computer connectable to the primary unit via a connection, for example a USB (Universal Serial Bus) connection. The external source may be mains electricity supply connectable to the primary unit via a plug and socket. The power capability of the primary unit's power source is preferably 3 to 6 Watts. The requirements that constrain the minimum size of the primary unit power supply are energy and charging time.

Also preferably, the electronic circuitry in the primary unit may include a microcontroller, a microprocessor, a digital signal processor (DSP), an application specific integrated circuit (ASIC) or any other programmable digital or analogue circuitry. The electronic circuitry in the primary unit has a number of functions including: to charge the primary unit power supply from an external source, to charge the secondary power supply in the secondary unit when not in use, and to control the heating elements in the secondary unit during the pre-heating mode. Preferably, the electronic circuitry may be arranged to communicate with a host via a wired connection, for example USB, or via a wireless connection, for example Bluetooth, to provide bi-directional transfer of data between the host and the primary and secondary units. Also preferably, the communication between the secondary unit and the primary unit may be facilitated when the secondary unit is in a docking port on the primary unit or when the secondary unit is stored in storage means in the primary unit.

As already mentioned, the primary unit may include an interface for external connection. Preferably, the interface operates under an interface standard. The connection may be a wired connection such as a USB link, or a wireless connection, such as Bluetooth. The wired connection may include a retractable cable. This may be used for charging the primary power supply. The connection may alternatively or additionally be used for extra functionality. For example, when the primary unit is connected to an external computer, the operation of the system may be checked and the smoker may be advised when maintenance is required, for example, when the primary or secondary unit power supply needs to be replaced. Additionally, the connection with a computer can allow the smoker to place an order for more smoking articles, download updates for any software, set personal consumption targets for individual smokers and share information. Further extended capabilities may be provided, not limited to those listed above. One or both of the primary and secondary units may include a digital display.

In the preferred embodiment, the power supply in the secondary unit provides enough energy to the heating elements to maintain the aerosol-forming substrate of the smoking article at an operating temperature, for a predetermined period of time or predetermined number of puffs taken during the smoking mode. The power supply in the secondary unit may be a battery, a supercapacitor, a fuel cell or any other suitable power supply which can provide enough energy to maintain the substrate at working temperature for the predetermined period of time or for the predetermined number of puffs. For example, the secondary unit power supply can include a plurality of lithium iron phosphate cells. In another embodiment, the secondary unit power supply includes a lithium polymer battery. Preferably, the predetermined period of time may be between 5 and 20 minutes, and the predetermined number of puffs may be between 5 and 20 puffs. Also preferably, the power capability of the secondary unit's power source is preferably 1 to 3 Watts. Moreover, the requirements that constrain the minimum size of the secondary unit power supply are energy provided per smoking experience, charging time and cycle life (that is, how often the power supply will need to be replaced).

As already mentioned, the secondary unit may include an interface for connection directly to an external source. Preferably, the interface operates under an interface standard. The connection may be a wired connection such as a USB link, or a wireless connection, such as Bluetooth. The wired connection may include a retractable cable. This may be used for charging the secondary power supply. The connection may alternatively or additionally be used for supplying power to the secondary power supply for the pre-heating mode. The connection may alternatively or additionally be used for extra functionality. Preferably, the connection allows bi-directional flow of data. For example, when the secondary unit is connected to an external computer, the operation of the system may be checked and the smoker may be advised when maintenance is required, for example, when the secondary unit power supply needs to be replaced or the secondary unit needs to be cleaned. Further extended capabilities may be provided, not limited to those listed above.

In the preferred embodiment, the electronic circuitry in the secondary unit may include a microcontroller, a microprocessor, a digital signal processor (DSP), an application specific integrated circuit (ASIC) or any other programmable digital or analogue circuitry. The secondary unit electronic circuitry works in conjunction with the primary unit electronic circuitry. The pre-heating mode may be initiated when the secondary unit is detected to be in connection with the primary power supply and a smoking article is detected in the secondary unit. This may be detected by the secondary circuitry or primary circuitry. Alternatively, a smoker may manually initiate the pre-heat, for example, by activating a switch on the primary or secondary unit or by opening the primary unit. During the pre-heating mode, the electronic circuitry in the secondary unit may communicate with the primary unit electronic circuitry to determine when the smoking article is ready to be smoked. During the smoking mode, the smoker may begin the smoking experience and continue the smoking experience puff by puff. The electronic circuitry in the secondary unit controls the heating elements to maintain the substrate at the operating temperature, or as close to the operating temperature as possible. The electronic circuitry in the secondary unit may be arranged to keep track of the number of puffs taken by the smoker, the amount of time between puffs and the amount of time that the heating elements have been energized. When either the number of puffs reaches the maximum number for the smoking article (so that the smoking article is depleted), the smoker has not taken a puff before the predetermined time, or the predetermined period of time has expired, but there are puffs remaining, a signal from the electronic circuitry notifies the smoker to return the secondary unit to the primary unit. Then, if appropriate, the power supply in the secondary unit can be recharged and the substrate returned to operating temperature. In this way, the smoker is able to stop and start the smoking experience, and restart the smoking experience until the smoking article is depleted.

In addition, the electronic circuitry may identify the smoking article in the secondary unit, adjust the heating profile based on the smoking article type and determine when the holder needs maintenance, for example when the heating elements need to be cleaned. The electronic circuitry in the secondary unit can also allow the secondary unit to be personalized for an individual's smoking behaviour. For example, duration of the smoking experience, time of each puff, time between puffs and intensity of each puff, may be recorded, the individual's consumption patterns may be tracked and the individual's preferred smoking article may be monitored. This may work in conjunction with a lock on the secondary unit, which allows only a particular smoker to use the secondary unit.

In order for the electronic circuitry in the secondary unit to count the number of puffs taken, the electronic circuitry may include a puff sensor for sensing air flow indicative of a puff. The sensor may be any suitable type of sensor, for example a thermistor, an optical device, an opto-mechanical device, an electro-mechanical device, or a micro electro mechanical systems (MEMS) device.

The shape and size of the secondary unit will, to a certain extent, depend on the size and shape of the secondary unit power supply. In principle, however, the secondary unit may be any suitable shape. Typically, the secondary unit is an elongate cylindrical unit having a size only slightly larger than the smoking article. In the preferred embodiment, the cross sectional shape of the secondary unit may be round, rectangular, or oval. Moreover, the secondary unit may include a cap for covering the smoking article when it is received in the secondary unit, for protection of the smoking article or for limiting odor. The secondary unit may include a cap for covering the open end of the secondary unit. Typically, when the smoking article is received in the secondary unit, approximately half the length of the smoking article protrudes from the secondary unit. Alternatively, less than half of the length of the smoking article protrudes from the secondary unit.

The heating element or elements in the secondary unit may be internal or external heating elements and are shaped to most effectively heat the aerosol-forming substrate. In the preferred embodiment, there may be a single heating element or multiple heating elements. Moreover, the heating elements may be made from an electrically resistive material including, but not limited to, a metal, a metal alloy, a ceramic or a semiconductor material. The most appropriate form for the heating element or elements will depend on the particular aerosol-forming substrate in the smoking article. Preferably, the aerosol-forming substrate is a solid substrate, but may, alternatively, be a liquid or gas substrate.

Preferably, the secondary unit is insulated to minimize heat loss during the smoking mode. The better insulated the secondary unit, the longer the substrate can remain at operating temperature, which can extend the predetermined period of time for the smoking mode.

FIG. 4a shows a pack of lit-end cigarettes. FIG. 4b shows one embodiment of the smoking system, in which the secondary unit in the form of the holder may be stored in the primary unit. FIG. 4c shows one embodiment of the smoking system of the present invention, in which the holder may be stored in the primary unit, even when a smoking article is received in the holder. FIGS. 4a, 4b and 4c are provided to show the relative sizes of embodiments of the smoking system of the present invention and a pack of lit-end cigarettes.

FIG. 4a shows a pack 401 for lit-end cigarettes 403. The lower view in FIG. 4a is a cross sectional side view. The upper view in FIG. 4a is a cross sectional top view. This pack has a width of about 55 mm, a height of about 90 mm and a depth of about 24 mm. FIG. 4a shows one example of a pack of lit-end cigarettes. Generally, packs of lit-end cigarettes have a height ranging from about 60 mm to about 150 mm, more typically a height ranging from about 70 mm to about 125 mm. Generally, packs of lit-end cigarettes have a width ranging from about 12 mm to about 150 mm, more preferably a width ranging from about 70 mm to about 125 mm. Generally, packs of lit-end cigarettes have a depth ranging from about 6 mm to about 100 mm, more preferably a depth ranging from about 12 mm to about 25 mm. Preferably, the dimensions of the packs are adapted to the length of the cigarettes, and the collation of the cigarettes.

In the preferred embodiment, packs of lit-end cigarettes may be in the shape of a rectangular parallelepiped, with right-angled longitudinal and right-angled transverse edges. Alternatively, the pack may include one or more rounded longitudinal edges, rounded transverse edges, bevelled longitudinal edges or bevelled transverse edges, or combinations thereof. Alternatively, the pack may have a non-rectangular transversal cross section, for example polygonal such as triangular or hexagonal, or oval, semi-oval, circular or semi-circular. The packs may be used to package smoking articles including, but not limited to, conventional lit-end cigarettes, cigars or cigarillos, heated smoking articles including a combustible fuel element or heat source and an aerosol-generating substrate (for example cigarettes of the type disclosed in U.S. Pat. No. 4,714,082) and smoking articles for use with electrical smoking systems (for example cigarettes of the type disclosed in U.S. Pat. No. 5,692,525).

Through an appropriate choice of the dimensions thereof, packs may be designed to hold different total numbers of smoking articles, or different arrangements of smoking articles. Packs may hold smoking articles of the same type or brand, or of different types or brands. In addition, both filterless smoking articles and smoking articles with various filter tips may be contained, as well as smoking articles of differing length and diameter. In addition, the smoking articles may differ in strength of taste, resistance to draw and total particulate matter delivery. The pack may include more than one of the different types of smoking articles listed above.

FIG. 4b shows a first embodiment of a smoking system according to the invention. The lower view in FIG. 4b is a cross sectional side view. The upper view in FIG. 4b is a cross sectional top view. The system includes a primary unit 405 and a holder 407. The primary unit 405 includes a primary power supply in the form of battery 409, storage for smoking articles 411, and a docking port 413 for receiving the holder. Preferably, the holder includes heating elements, indicated schematically at 415. Also preferably, when the holder is stored in the docking port of the primary unit, the lid portion (not shown) can be closed. However, when the holder is stored in the docking port of the primary unit with a smoking article is received in the holder (as shown in FIG. 4b), the lid portion cannot be closed. In the preferred embodiment, the smoking system has a width of about 56 mm, a height of about 95 mm and a depth of about 25 mm.

FIG. 4c shows a second embodiment of a smoking system according to the invention. The lower view in FIG. 4c is a cross sectional side view. The upper view in FIG. 4c is a cross sectional top view. As shown, the system includes a primary unit 405' and a holder 407'. Preferably, the primary unit includes a battery 409', storage for smoking articles 411', and a docking port 413' for receiving the holder. Also preferably, the holder 407' includes heating elements, indicated schematically at 415'. Moreover, when the holder is stored in the docking port of the primary unit, even with a smoking article received in the holder (as shown in FIG. 4c), the lid portion (not shown) can be closed. This is because the holder 407' has a different construction from holder 407, in particular the heating elements are positioned differently. The smoking system has a width of about 56 mm, a height of about 95 mm and a depth of about 25 mm.

It can be seen from FIGS. 4a, 4b and 4c that at least two embodiments of the smoking system of the present invention are of a similar size and shape as a pack of lit-end cigarettes. Other embodiments of the smoking system may be of a similar size and shape to other pack sizes and shapes, as described above. All the components required for the smoking experience are contained in the single compact unit.

Figure 5:
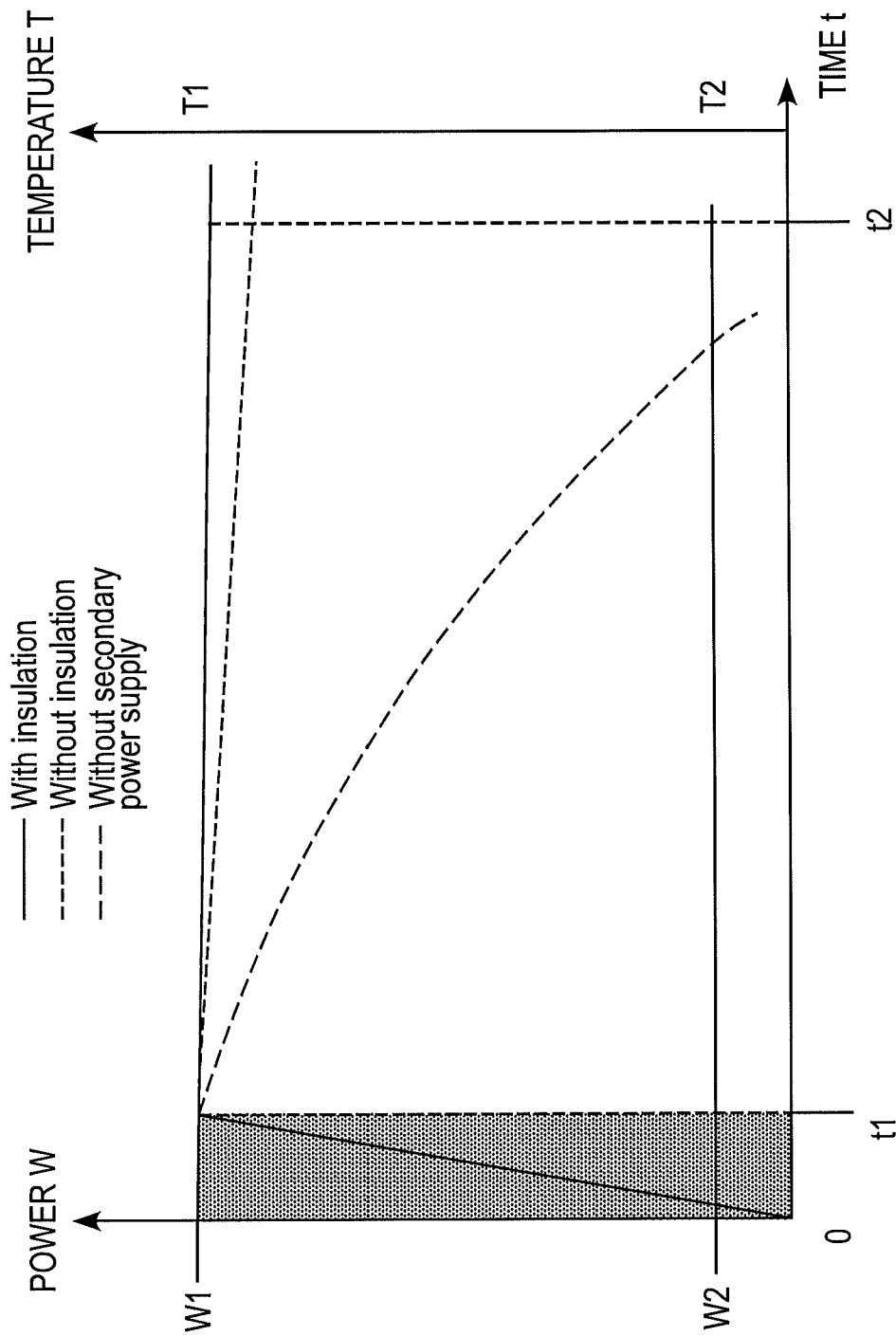
FIG. 5 shows a graph of power versus time during operation of the smoking system according to a preferred embodiment.

Operation of the electrically heated smoking system will now be described with reference to FIG. 5. FIG. 5 is a graph of power used W and temperature T versus time t for the pre-heating and smoking modes.

In use, the smoker first inserts a smoking article into the secondary unit 500, shown in FIG. 6. At this time, the secondary unit 500 can be connected to, or separate from, the primary unit 502.

Second, the secondary unit 500 is connected to the primary unit 502 (if not already connected) (or an alternative source of power) and the primary power supply 516 in the primary unit 502 begins to charge the secondary power supply 508 in the secondary unit. The charging time will depend on the details of the smoking system, but is not more than about 5 minutes in the preferred embodiment. In an alternative embodiment, the order of the first two steps may be reversed. For example, the secondary unit 500 may be stored in or on the primary unit 502 when not in use, so that the secondary power supply 508 is fully charged and the secondary unit 500 is ready for a smoker to initiate the smoking experience at any time. In that case, the secondary power supply 508 in the secondary unit 500 is charged before a smoking article is inserted into the portable secondary unit.

Third, once the secondary power supply 508 is fully charged (this can be indicated by a signal on the primary or secondary unit), the smoker may begin the pre-heating mode. Additionally, the pre-heating mode may be initiated prior to or at the same time that the charging mode begins. The pre-heating mode may be started by the smoker pressing a button or flipping a switch when he or she is ready to begin the smoking experience. Alternatively, the smoker may begin the pre-heating mode by shaking the unit a predetermined number of times to begin the pre-heat phase. At the beginning of the pre-heating mode, at time 0 in the graph of FIG. 5, the primary power supply is then connected to the heating elements 504 in the secondary unit 500, under control of the electronic circuitry in the primary 502 and secondary 500 units. The heating elements 504 are energized until the substrate in the smoking article reaches the desired operating temperature T1 (e.g., between approximately 150 and 250° C.). During the pre-heating mode (shown by the shaded box in FIG. 5), the temperature of the substrate is raised rapidly, but in a controlled manner in order to avoid overshoot. In the preferred embodiment, a temperature sensor is located in the primary unit. The secondary unit 500 may also include a temperature sensor. In another embodiment, the primary unit 502 or the secondary unit 500 may detect that the substrate has reached the desired operating temperature T1 after an energizing period t1 has elapsed. The energizing period may range from about 10 seconds to about 150 seconds. At the end of this pre-heating period, t1 in FIG. 5, electronic circuitry 514 in the primary unit 502 may generate a signal to indicate that the pre-heating period mode is complete and that the smoker can begin the smoking experience.

Fourth, the smoker may now remove the portable secondary unit 500 (with the received smoking article) from the primary unit 502 to begin the smoking mode. This can occur at time t1 in the graph of FIG. 5. During the smoking mode, the secondary power supply 508 in the secondary unit 500, is used to maintain the substrate at or close to operating temperature T1. Preferably, the heating elements 504 provide enough heat to the substrate to maintain the substrate at operating temperature, thereby compensating for heat losses through the secondary unit 500, and as air is drawn through the secondary unit 500 during each puff. Also preferably, the electronic circuitry 506 in the secondary unit 500 records the time elapsed, the time between puffs and/or the number of puffs taken, since the portable secondary unit 500 was removed from the primary unit 502 at time t1.

In FIG. 5, three plots are shown during the smoking mode. The first, solid line indicates the temperature when the secondary unit is insulated. This is the preferred embodiment and, as can be seen from FIG. 5, maintains the substrate very close to the operating temperature T1 and power W1. The second, dotted line indicates the temperature when the secondary unit is not insulated. In that embodiment, the substrate is still maintained close to the operating temperature T1, but there is more heat loss than when the secondary unit is insulated. The third, dashed line indicates the temperature without any secondary power supply in the secondary unit. In that arrangement, the temperature of the substrate falls away quickly during the smoking mode.

Fifth, the electronic circuitry 506 in the secondary unit 500 either detects that the maximum number of puffs (e.g., ranging from about 5 to about 20 puffs per smoking article) has been reached, or the maximum amount of time for the smoking mode (e.g., about 5 to about 20 minutes after the smoker has removed the holder from the primary unit) has expired, or the maximum amount of time between puffs (e.g., about 30 sec to about 5 minutes) has expired. This is time t2 in the graph of FIG. 5. In the first case, if the electronic circuitry 506 in the secondary unit 500 detects that the maximum puff count has been reached for the smoking article, the electronic circuitry 506 will stop energizing the heating elements 504 to maintain the substrate at the desired operating temperature. If the maximum number of puffs have been taken by the smoker during the smoking mode, the electronic circuitry 506 in the secondary unit 500 generates a signal to the smoker indicating that the maximum number of puffs have been taken. This signal may be in the form of a display on the portable secondary unit 500 (for example indicating the number of puffs remaining), one or more indicator lights, such as LEDs, which switch on or off as the puffs are taken, an audible notification such as a buzzer, a silent notification such as a vibration, or any other suitable signal. In the second case, if the electronic circuitry 506 in the secondary unit 500 detects that the maximum amount of time for the smoking mode has expired, the electronic circuitry 506 will stop maintaining the operating temperature at the substrate and will generate a signal to the smoker indicating that time for the smoking mode has expired. This signal can be any suitable signal as described above. In the third case, if the maximum amount of time allowed for the smoker to take consecutive puffs has expired, the electronic circuitry generates a signal to the smoker indicating that a puff has not been taken during the allowed time. This signal can be any suitable signal as described above. The signals can indicate that the secondary unit 500 should be returned to the primary unit 502 for charging and to start the pre-heating mode.

Sixth and finally, the smoker may reconnect the portable secondary unit 500 and the primary power supply and the primary unit 502 begins to recharge the secondary power supply 508 in the portable secondary unit again. The secondary unit 500 can be connected to the primary unit 502 via a primary interface 512 and a secondary interface 510. Once the secondary power supply 508 in the secondary unit 500 is fully charged, if puffs remain, the smoker can restart the smoking experience from the third step. Thus, the smoker can start and stop the smoking experience as desired.

As described, embodiments of the invention provide a number of advantages. First, by dividing the system, in particular the power supply, into two portions, the size of the secondary unit can be reduced. Second, the secondary unit can facilitate puff on demand, and the smoking experience can be started and stopped. Embodiments for a single smoker, which have a size and shape similar to that of a pack of lit-end cigarettes, are advantageous since there will need to be minimal disruption to the smoker's smoking behaviour for the smoker to adopt the product. In addition, the smoker need only carry the single unit which provides all the components required for the smoking experience. Embodiments which provide a plurality of secondary units for use by a plurality of smokers are advantageous since they facilitate social interaction. Embodiments in which the secondary unit is personalized allow the smoker to prevent unauthorized use and the performance may be adapted to best suit the smoker.

In this specification, the word "about" is often used in connection with numerical values to indicate that mathematical precision of such values is not intended. Accordingly, it is intended that where "about" is used with a numerical value, a tolerance of ±10% is contemplated for that numerical value.

In this specification the words "generally" and "substantially" are sometimes used with respect to terms. When used with geometric terms, the words "generally" and "substantially" are intended to encompass not only features which meet the strict definitions but also features which fairly approximate the strict definitions. In this connection, the term "rounded" is intended to also include configurations including two or more substantially straight line segments describing the "rounded" feature.

While the foregoing describes in detail a preferred electrically heated smoking system having a unit for receiving a smoking article with reference to a specific embodiment thereof, it will be apparent to one skilled in the art that various changes and modifications may be made to the electrically heated smoking system, which do not materially depart from the spirit and scope of the foregoing description. Accordingly, all such changes, modifications, and equivalents that fall within the spirit and scope of the appended claims are intended to be encompassed thereby.

We claim:

1. An electrically heated smoking system comprising separate primary and secondary units, the primary unit comprising:
   a primary unit housing, the primary unit housing including: a primary power supply, primary circuitry, and
   a docking port including a docking port interface electrically connected to the primary power supply:
      the secondary unit comprising:
   a secondary unit housing configured to receive an aerosol forming substrate, the secondary unit housing shaped to be received in the docking port of the primary unit, the secondary unit housing including:
   at least one heating element within the secondary unit housing, the at least one heating element operable to heat an aerosol forming substrate received by the secondary unit housing when the at least one heating element is supplied electrical power:
   a secondary unit interface electrically connected to the at least one heating element, the secondary unit interface on the secondary unit housing wherein the secondary unit interface is electrically connected to the docking port interface when the secondary unit is in the docking port of the primary unit such that the primary power supply supplies electrical power to the at least one heating element during a pre-heating mode, to increase the temperature of an aerosol forming substrate received by the secondary unit housing to an operating temperature;
   a secondary power supply within the secondary unit housing, the secondary power supply configured to supply electrical power to the at least one heating element during a smoking mode after the pre-heating mode when the secondary unit is separated from the primary unit; and
   secondary circuitry within the secondary unit housing, the secondary circuitry configured to control the secondary power supply in supplying electrical power to the at least one heating element during the smoking mode;
   wherein the secondary unit is about the size of a lit-end cigarette such that a user can hold the secondary unit between their fingers in a similar way to a lit-end cigarette;
   further comprising a plurality of secondary units each configured to receive an aerosol forming substrate, wherein the primary unit includes a respective docking port for each of the plurality of secondary units such that the secondary unit interface of each secondary unit may be electrically connected to a respective docking port interface of the respective docking ports;
   wherein the primary unit includes a plurality of electrically connectable modules, each module including a docking port configured to receive a respective secondary unit;

(a) the plurality of electrically connectable modules are magnetically attachable;
and/or
(b) a first module of the plurality of modules includes an external power connection, the first module electrically connected to at least a second module wherein the first module is operable to provide power to the second module.

\* \* \* \* \*